(12) United States Patent
Dickens et al.

(10) Patent No.: US 12,554,510 B2
(45) Date of Patent: Feb. 17, 2026

(54) IDENTIFICATION AND MANAGEMENT OF REMOTE BOOT OPERATING SYSTEMS

(71) Applicant: International Business Machines Corporation, Armonk, NY (US)

(72) Inventors: Louie A. Dickens, Tucson, AZ (US); Tara Astigarraga, Fairport, NY (US); Maunik Patel, Tucson, AZ (US); Jimmy Pazhoor John, Cary, NC (US); Kieron Dirk Anthony Hinds, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 113 days.

(21) Appl. No.: 18/741,589

(22) Filed: Jun. 12, 2024

(65) Prior Publication Data
US 2025/0383885 A1    Dec. 18, 2025

(51) Int. Cl.
G06F 15/177 (2006.01)
G06F 9/4401 (2018.01)
G06N 20/00 (2019.01)

(52) U.S. Cl.
CPC .......... G06F 9/4416 (2013.01); G06N 20/00 (2019.01); *G06F 9/4401* (2013.01)

(58) Field of Classification Search
CPC .................................................. G06F 9/4401
USPC .......................................................... 713/2
See application file for complete search history.

(56) References Cited

U.S. PATENT DOCUMENTS

| | | | |
|---|---|---|---|
| 7,328,260 B1 * | 2/2008 | Muthiyan | H04L 41/0681 711/170 |
| 8,060,587 B2 * | 11/2011 | Ahmad | H04L 41/06 709/227 |
| 11,086,555 B1 | 8/2021 | Botes et al. | |
| 11,089,105 B1 | 8/2021 | Karumbunathan et al. | |
| 11,573,864 B1 * | 2/2023 | Azmy Hassan | G06F 11/3409 |
| 11,716,385 B2 | 8/2023 | Karumbunathan et al. | |

(Continued)

OTHER PUBLICATIONS

Oracle, "Configuring VMware vSphere 6 with Oracle Flash Storage Systems," Oracle White Paper, Apr. 2016, 52 pages.

(Continued)

*Primary Examiner* — Volvick Derose
(74) *Attorney, Agent, or Firm* — Zilka-Kotab, P.C.

(57) ABSTRACT

A method, according to one approach, includes: sending multiple different operating system commands to hosts connected to a SAN. Information received in response from the hosts is compared against known operating system command results, and historical relationships are created between the hosts and the SAN. These historical relationships are also used to train an AI based model to: identify relationship changes between the hosts and the SAN. Identified relationship changes are compared against known fingerprints. However, in response to determining an identified relationship change does not match one of the known fingerprints, between 1 and N additional operating system commands are issued to the respective hosts. Additional information received from the hosts in response to the additional operating system commands, is compared against the known fingerprints. Moreover, in response to the additional information matching one of the known fingerprints, between 1 and M operating system specific commands are issued.

20 Claims, 11 Drawing Sheets

(56) References Cited

U.S. PATENT DOCUMENTS

| | | | |
|---|---|---|---|
| 11,748,133 B2 | 9/2023 | Lent et al. | |
| 11,789,831 B2 | 10/2023 | Colgrove et al. | |
| 2002/0156984 A1* | 10/2002 | Padovano | G06F 11/201 |
| | | | 711/148 |
| 2003/0179227 A1* | 9/2003 | Ahmad | H04L 67/1097 |
| | | | 715/736 |
| 2006/0047852 A1* | 3/2006 | Shah | G06F 9/4405 |
| | | | 709/245 |
| 2007/0192466 A1* | 8/2007 | Nahum | G06F 9/4416 |
| | | | 709/223 |
| 2013/0339600 A1* | 12/2013 | Shah | G06F 3/0656 |
| | | | 711/170 |
| 2016/0070625 A1* | 3/2016 | Allu | G06F 11/1417 |
| | | | 714/4.11 |
| 2016/0087843 A1* | 3/2016 | Nema | H04L 41/0895 |
| | | | 709/220 |
| 2016/0203000 A1* | 7/2016 | Parmar | H04L 67/34 |
| | | | 713/2 |
| 2016/0299767 A1* | 10/2016 | Mukadam | G06F 13/426 |
| 2018/0260569 A1* | 9/2018 | Sutton | H04L 63/18 |
| 2020/0045125 A1* | 2/2020 | Glimcher | G06F 3/061 |
| 2021/0334123 A1* | 10/2021 | Lent | G06F 9/4411 |
| 2022/0070190 A1* | 3/2022 | Giterman | G06F 13/4221 |
| 2025/0348322 A1 | 11/2025 | Dickens et al. | |

OTHER PUBLICATIONS

Dell Inc., "Dell EMC Host Connectivity Guide for Vmware ESXi Server," Dell Inc., Rev. 53, Jul. 2020, 121 pages.

Vmware, "vSphere Storage," Vmware Inc., 2023, 423 pages.

Dell Technologies, "Marvell® QLogic® 2770 Series, Enhanced 32GFC Fibre Channel Adapters, PCIe® 4.0," Dell Technologies, Product Brief, 2023, 7 pages.

Anonymous, "Method for improving volume delete performance in a deduplicated environment," IP.com Prior Art Database, Technical Disclosure No. IPCOM000263546D, Sep. 10, 2020, 6 pages.

Anonymous, "A method of Storage Customization and OS Quick Boot for Baremetal server based on FC-SAN in Cloud," IP.com Prior Art Database, Technical Disclosure No. IPCOM000251517D, Nov. 7, 2017, 6 pages.

Anonymous, "Unique Method and System to Identify Host and Configure them in SAN Controller," IP.com Prior Art Database, Technical Disclosure No. IPCOM000214693D, Feb. 3, 2012, 9 pages.

\* cited by examiner

IDENTIFICATION AND MANAGEMENT OF REMOTE BOOT OPERATING SYSTEMS

BACKGROUND

The present invention relates to operating systems, and more specifically, this invention relates to remote booting operating systems.

Local area network (LAN) and storage area network (SAN) booting has become an increasingly popular alternative to the traditional process of booting locally. As used herein, "SAN booting" (e.g., also referred to as "remote boot(s)" and/or "boot(s) from a SAN") is a process that allows locations (e.g., servers) to boot operating systems that are installed on external SAN-based storage, e.g., rather than a local disk. Moreover, "LAN booting" as used herein (e.g., also referred to as "remote boot(s)" and/or "boot(s) from a LAN") is a process that allows locations (e.g., servers) to boot operating systems that are installed on external LAN-based storage, e.g., rather than a local disk. LAN and/or SAN booting thereby effectively attaches remote computer storage devices to servers.

While LAN and/or SAN booting provides some benefits over conventional local booting, increased adoption of LAN and/or SAN booting and technological advancements have led to some unforeseen setbacks for conventional products. For example, changes (e.g., updates) to data and/or operating systems impact existing LAN and/or SAN bootings. Thus, as data production and software updates continues to increase, particularly as computing power and the use of IoT devices advances, so does the computational overhead that conventional products expend simply to maintain.

It follows that there are currently no automated and/or time efficient processes to identify and/or monitor which hosts and related applications are remote booted from one or more storage devices and/or drives.

SUMMARY

A computer-implemented method (CIM), according to one approach, includes: sending multiple different operating system commands to hosts connected to a SAN. The information received from the hosts in response to the operating system commands, is compared against known operating system command results. Historical relationships between hosts and the SAN are further created using the received information and the known operating system command results. These historical relationships are also used to train an artificial intelligence (AI) based model to: identify relationship changes between the hosts and the SAN. In response to identifying a relationship change between the hosts and the SAN, the identified relationship change is compared against known fingerprints. However, in response to determining the identified relationship change does not match one of the known fingerprints, between 1 and N additional operating system commands are issued to the respective hosts. The CIM thereby further includes comparing additional information received from the hosts in response to the additional operating system commands, against the known fingerprints. Further still, in response to the additional information matching one of the known fingerprints, between 1 and M operating system specific commands are issued.

A computer program product (CPP), according to another approach, includes: a set of one or more computer-readable storage media, and program instructions. The program instructions are collectively stored in the set of one or more storage media, and are for causing a processor set to perform the foregoing CIM.

A computer system (CS), according to yet another approach, includes: a processor set, and a set of one or more computer-readable storage media. The CS additionally includes program instructions that are collectively stored in the set of one or more storage media, and which are for causing the processor set to perform the foregoing CIM.

Other aspects and implementations of the present invention will become apparent from the following detailed description, which, when taken in conjunction with the drawings, illustrate by way of example the principles of the invention.

DETAILED DESCRIPTION

Figure 1:
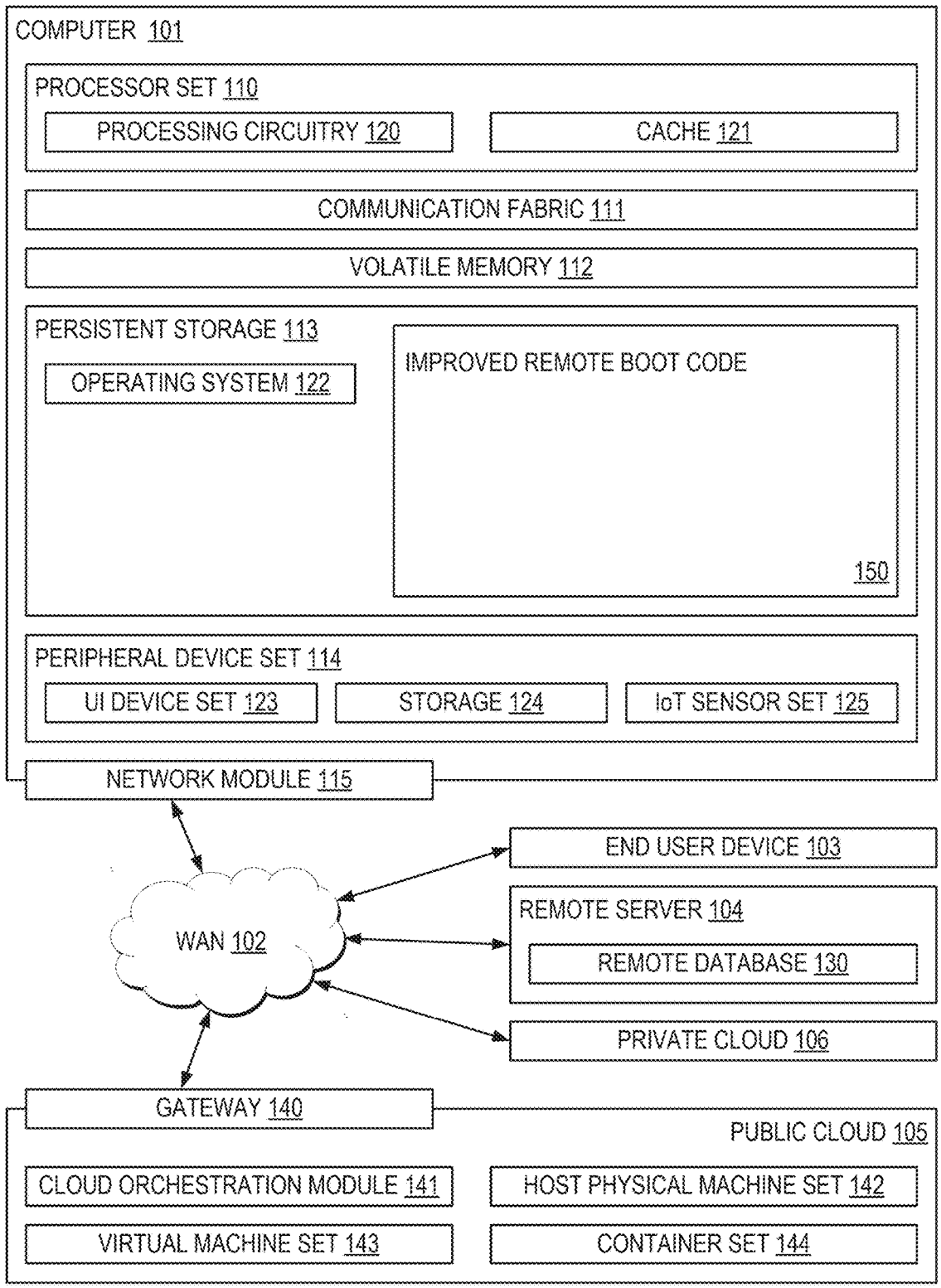
FIG. 1 is a diagram of a computing environment, in accordance with one approach.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred approaches of systems, methods, and computer program products for identifying and managing remote hosts that have remote booted operating systems from data storage. Approaches herein involve developing static and long-term heuristics that outline the historical relationships between hosts, the memory storing the operating systems, and/or the networks that facilitate the remote booting. Moreover, these developed heuristics and related information are used to train AI based models such that the models are configured to automatically identify hosts that have booted an operating system over a network from I/Os in real-time, e.g., as will be described in further detail below.

In one general approach, a CIM includes: sending multiple different operating system commands to hosts connected to a SAN. The information received from the hosts in response to the operating system commands, is compared against known operating system command results. Historical relationships between hosts and the SAN are further created using the received information and the known operating system command results. These historical relationships are also used to train an artificial intelligence (AI) based model to: identify relationship changes between the hosts and the SAN. In response to identifying a relationship change between the hosts and the SAN, the identified relationship change is compared against known fingerprints. However, in response to determining the identified relationship change does not match one of the known fingerprints, between 1 and N additional operating system commands are issued to the respective hosts. The CIM thereby further includes comparing additional information received from the hosts in response to the additional operating system commands, against the known fingerprints. Further still, in response to the additional information matching one of the known fingerprints, between 1 and M operating system specific commands are issued.

In another general approach, a CPP includes: a set of one or more computer-readable storage media, and program instructions. The program instructions are collectively stored in the set of one or more storage media, and are for causing a processor set to perform the foregoing CIM.

In yet another general approach, a CS includes: a processor set, and a set of one or more computer-readable storage media. The CS additionally includes program instructions that are collectively stored in the set of one or more storage media, and which are for causing the processor set to perform the foregoing CIM.

Various aspects of the present disclosure are described by narrative text, flowcharts, block diagrams of computer systems and/or block diagrams of the machine logic included in computer program product (CPP) approaches. With respect to any flowcharts, depending upon the technology involved, the operations can be performed in a different order than what is shown in a given flowchart. For example, again depending on the technology involved, two operations shown in successive flowchart blocks may be performed in reverse order, as a single integrated step, concurrently, or in a manner at least partially overlapping in time.

A computer program product approach ("CPP approach" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as improved remote boot code at block 150 for identifying and managing remote hosts that have remote booted operating systems from data storage. Approaches herein involve developing static and long-term heuristics that outline the historical relationships between hosts, the memory storing the operating systems, and/or the networks that facilitate the remote booting. Moreover, these developed heuristics and related information are used to train AI based models such that the models are configured to automatically identify hosts that have booted an operating system over a network from I/Os in real-time, e.g., as will be described in further detail below.

In addition to block 150, computing environment 100 includes, for example, computer 101, wide area network (WAN) 102, end user device (EUD) 103, remote server 104, public cloud 105, and private cloud 106. In this approach, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IOT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various approaches, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some approaches, storage 124 may take the form of a quantum computing storage device for storing data in the form of qubits. In approaches where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some approaches, network control functions and network forwarding functions of network module 115 are performed on the same physical hardware device. In other approaches (for example, approaches that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some approaches, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some approaches, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other approaches a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this approach, public cloud 105 and private cloud 106 are both part of a larger hybrid cloud.

CLOUD COMPUTING SERVICES AND/OR MICROSERVICES (not separately shown in FIG. 1): private and public clouds 106 are programmed and configured to deliver cloud computing services and/or microservices (unless otherwise indicated, the word "microservices" shall be interpreted as inclusive of larger "services" regardless of size). Cloud services are infrastructure, platforms, or software that are typically hosted by third-party providers and made available to users through the internet. Cloud services facilitate the flow of user data from front-end clients (for example, user-side servers, tablets, desktops, laptops), through the internet, to the provider's systems, and back. In some approaches, cloud services may be configured and orchestrated according to as "as a service" technology paradigm where something is being presented to an internal or external customer in the form of a cloud computing service. As-a-Service offerings typically provide endpoints with which various customers interface. These endpoints are typically based on a set of APIs. One category of as-a-service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with these things. Another category is Software as a Service (SaaS) where software is centrally hosted and allocated on a subscription basis. SaaS is also known as on-demand software, web-based software, or web-hosted software. Four technological sub-fields involved in cloud services are: deployment, integration, on demand, and virtual private networks.

In some aspects, a system according to various approaches may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

Of course, this logic may be implemented as a method on any device and/or system or as a computer program product, according to various approaches.

As noted above, LAN and SAN booting has become an increasingly popular alternative to the traditional process of booting locally. As used herein, "SAN booting" (e.g., also referred to as "remote boot(s)" and/or "boot(s) from a SAN") is a process that allows locations (e.g., servers) to boot operating systems that are installed on external SAN-based storage, e.g., rather than a local disk. Moreover, "LAN booting" as used herein (e.g., also referred to as "remote boot(s)" and/or "boot(s) from a LAN") is a process that allows locations (e.g., servers) to boot operating systems that are installed on external LAN-based storage, e.g., rather than a local disk. LAN and/or SAN booting thereby effectively attaches remote computer storage devices to servers.

While LAN and/or SAN booting provides some benefits over conventional local booting, increased adoption of LAN and/or SAN booting and technological advancements have led to some unforeseen setbacks for conventional products. For example, changes (e.g., updates) to data and/or operating systems impact existing LAN and/or SAN bootings. Thus, as data production and software updates continues to increase, particularly as computing power and the use of IoT devices advances, so does the computational overhead that conventional products expend simply to maintain.

It follows that there are currently no automated and/or time efficient processes to identify and/or monitor which hosts and related applications are LAN and/or SAN booted from one or more storage devices and/or drives. In sharp contrast to these conventional shortcomings, the approaches herein are desirably able to develop a historical relationship between hosts and the locations that store the operating systems used to form the relationship over a network (e.g., SAN, LAN, etc.). Although not conventionally available, having this information available becomes extremely important in situations that involve system reboots, upgrades to operating systems, decommissioning storage, etc.

Moreover, this historical relationship may be used to train AI based models to identify relationship changes between hosts and the locations that store the operating systems used to form the relationship over a network. Approaches herein are thereby able to utilize AI that has been trained with known LAN and/or SAN boot related commands to detect SAN boot commands in real-time data while the data is in flight. Once a LAN and/or SAN boot command has been detected, information associated with the corresponding hosts and/or other pertinent information may thereby be recorded and used to retrain the AI based models. It follows that by using these steps and a heuristic process as described in the approaches herein, a complete understanding (e.g., map) of the relationships between hosts and the locations that remotely store the operating systems would be available to an administrator, e.g., as will be described in further detail below. It should also be noted that while some approaches herein are described in the context of relationships between hosts and memory over a SAN, this is in no way intended to be limiting. Rather, approaches herein that are described in the context of SANs may be understood as extending to include LANs or any other type of network that would be apparent to one skilled in the art after reading the present description.

Figure 2A:
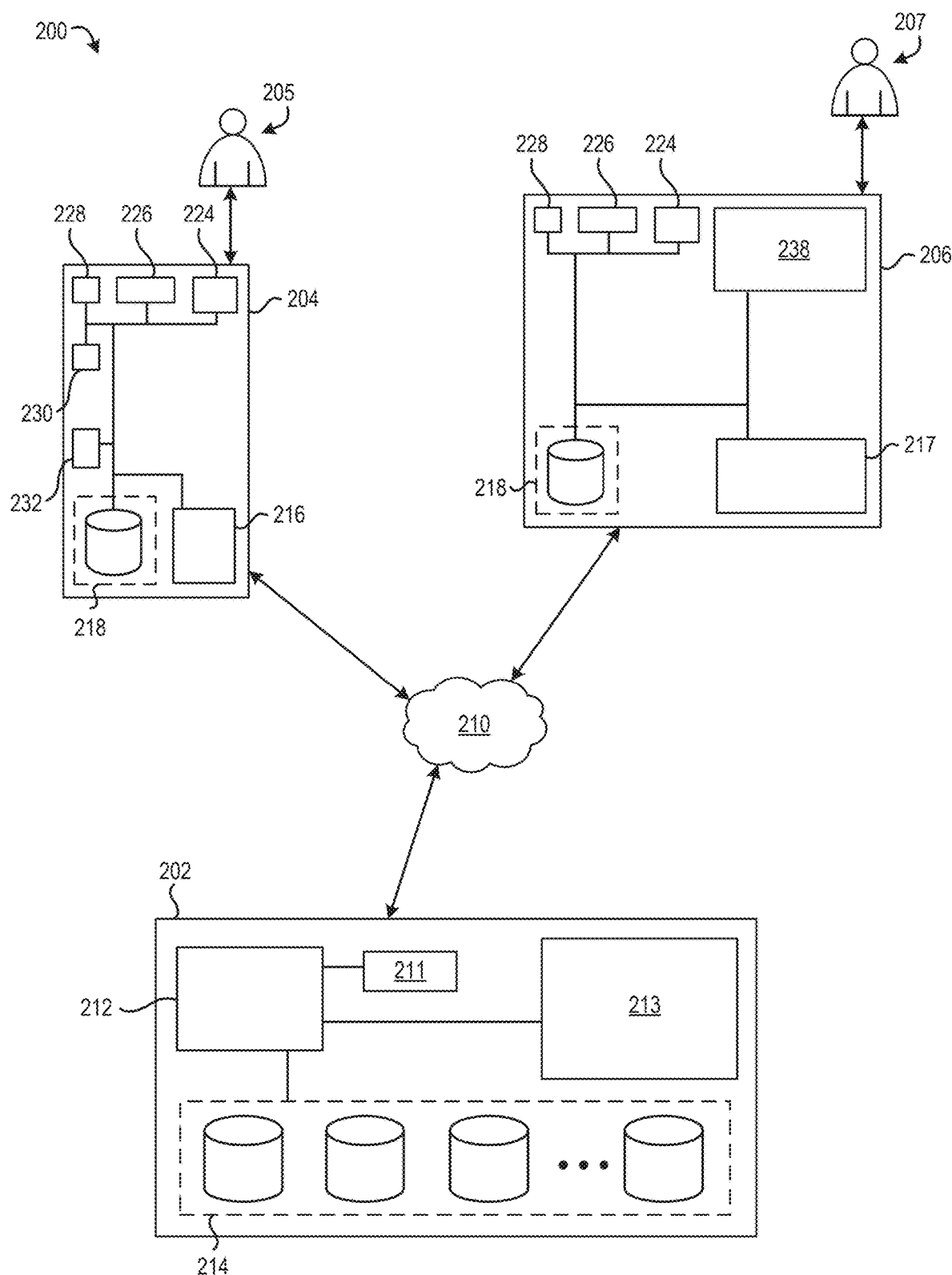
FIG. 2A is a representational view of a distributed system, in accordance with one approach.

Looking now to FIG. 2A, a system 200 having a distributed architecture is illustrated in accordance with one approach. As an option, the present system 200 may be implemented in conjunction with features from any other approach listed herein, such as those described with reference to the other FIGS., such as FIG. 1. However, such system 200 and others presented herein may be used in various applications and/or in permutations which may or may not be specifically described in the illustrative approaches or implementations listed herein. Further, the system 200 presented herein may be used in any desired environment. Thus FIG. 2A (and the other FIGS.) may be deemed to include any possible permutation.

As shown, the system 200 includes a central server 202 that is connected to a host device 204, and an edge node 206 accessible to the host 205 and administrator 207, respectively. The host device 204 and edge node 206 may thereby be considered "endpoint devices," each of which are connected to the central server 202. The central server 202, host device 204, and edge node 206 are each connected to a network 210, and may thereby be positioned in different locations.

As noted above, in some approaches the network 210 may be a SAN. In such approaches, the system 200 may be a data storage system of any type, e.g., depending on the desired approach. In other approaches the network 210 may be a LAN. However, an illustrative list of other network types which network 210 may implement includes, but is not limited to, a WAN, a PSTN, a SAN, an internal telephone network, etc. As a result, any desired information, data, commands, instructions, responses, requests, etc. may be sent between host device 204, edge node 206, and/or central server 202, regardless of the amount of separation which exists therebetween, e.g., despite being positioned at different geographical locations. According to some approaches, which are in no way intended to be limiting, the central server 202 is a remote cloud server that is connected to (e.g., may be accessed by) host device 204 and/or edge node 206.

It should also be noted that two or more of the host device 204, edge node 206, and central server 202 may be connected differently depending on the approach. According to an example, which is in no way intended to limit the invention, two servers (e.g., nodes) may be located relatively close to each other and connected by a wired connection, e.g., a cable, a fiber-optic link, a wire, etc.; etc., or any other type of connection which would be apparent to one skilled in the art after reading the present description.

The terms "host" and "administrator" are in no way intended to be limiting either. For instance, while hosts and administrators may be described as being individuals in various implementations herein, a host and/or an administrator may be an application, an organization, a preset process, etc. The use of "data," "datasets," "metadata," and "information" herein are in no way intended to be limiting either, and may include any desired type of details, e.g., depending on the type of operating system implemented on the host device 204, edge node 206, and/or central server 202.

With continued reference to FIG. 2A, the central server 202 includes a large (e.g., robust) processor 212 coupled to a cache 211, an AI module 213, and a data storage array 214 having a relatively high storage capacity. The AI module 213 may include any desired number and/or type of AI-based models, e.g., such as machine learning models, deep learning models, neural networks, etc. In preferred approaches, the AI module 213 includes models that have been trained to discover hosts that are currently (or have been previously) SAN booted to each of the various logical unit numbers (LUNs) within a physical storage device.

For example, the AI module 213 includes models that have been trained to identify any operating systems running on host device 204 and/or edge node 206 that have SAN booted from the LUNs in data storage array 214. The AI module 213 may thereby be used to evaluate various information received from host device 204 and/or edge node 206 to identify SAN boot operations, preferably in real-time as they are received and processed. This provides approaches herein an updated and accurate understanding of all existing and previous relationships between hosts and the memory that stores the operating systems the respective hosts are booting from. Approaches herein are thereby able to desirably achieve reduced power consumption, reduced heat production, lower server capex, achieve more efficient use of storage capacity, increase availability, perform rapid disaster recovery, achieve centralized server management, improve performance, etc. It follows that AI module 213 and/or processor 212 may be used to perform one or more of the operations in method 300 to identify remote hosts that have SAN booted operating systems from the LUNs in data storage, e.g., as will be described in further detail below.

With continued reference to FIG. 2A, the host device 204 itself includes a processor 216 that is coupled to memory 218. The processor 216 may receive inputs from, and interface with, host 205. According to an example, the host device 204 is a mobile phone accessible to host 205. For instance, the host 205 may input information using one or more of: a display screen 224, keys of a computer keyboard 226, a computer mouse 228, a microphone 230, and a camera 232. The processor 216 may thereby be configured to receive inputs (e.g., text, sounds, images, motion data, etc.) from any of these components as entered by the host 205. These inputs typically correspond to information presented on the display screen 224 while the entries were received. Moreover, the inputs received from the keyboard 226 and computer mouse 228 may impact the information shown on display screen 224, data stored in memory 218, information collected from the microphone 230 and/or camera 232, status of an operating system being implemented by processor 216, etc.

Host device 204 may implement at least one operating system. For example, processor 216 may be used to initiate the operating system in response to the host device 204 being powered on from a sleep or "off" state. In other approaches, processor 216 may receive instructions to initiate an operating system from host 205, edge node 206, central server 202, etc. The process of initiating the operating system preferably includes SAN booting the operating system from remote storage. As noted above, "SAN booting" (e.g., also referred to as "remote boot(s)" and/or "boot(s) from a SAN") as used herein refers to a process that allows locations (e.g., servers) to boot operating systems that are installed on external (SAN-based) storage, e.g., rather than local storage. SAN booting thereby effectively creates a relationship between remote computer storage devices and servers.

With continued reference to FIG. 2A, some of the components included in edge node 206 may be the same or similar to those included in host device 204, and have therefore been given corresponding numbering. For instance, controller 217 is coupled to memory 218, a display screen 224, keys of a computer keyboard 226, and a computer mouse 228. Additionally, the controller 217 is coupled to an AI module 238. As described above with respect to AI module 213, the AI module 238 may include any desired number and/or type of AI-based models, e.g., such as machine learning models, deep learning models, neural networks, etc. However, in preferred approaches the AI module 238 includes models that have been trained to discover hosts that are currently (or have been previously) SAN booted from a storage device.

For example, the AI module 238 includes models that have been trained to identify operating systems running on host device 204 and/or central server 202 that have SAN booted from the LUNs in memory 218. The AI module 238 may thereby be used to evaluate various information received from host device 204 and/or central server 202 to identify SAN boot operations, preferably in real-time as they are received and processed. Approaches herein are thereby able to achieve an updated and accurate understanding of all existing and previous relationships between hosts and the memory they are each SAN booted from to create the relationships. Approaches herein can thereby reduce power consumption, reduce heat production, lower server capex, achieve more efficient use of storage capacity, increase availability, perform rapid disaster recovery, achieve centralized server management, improved performance, etc. It follows that AI module 238 and/or controller 217 may be used to perform one or more of the operations in method 300 to identify remote hosts that have SAN booted operating systems from the LUNs in data storage, e.g., as will be described in further detail below.

Figure 2B:
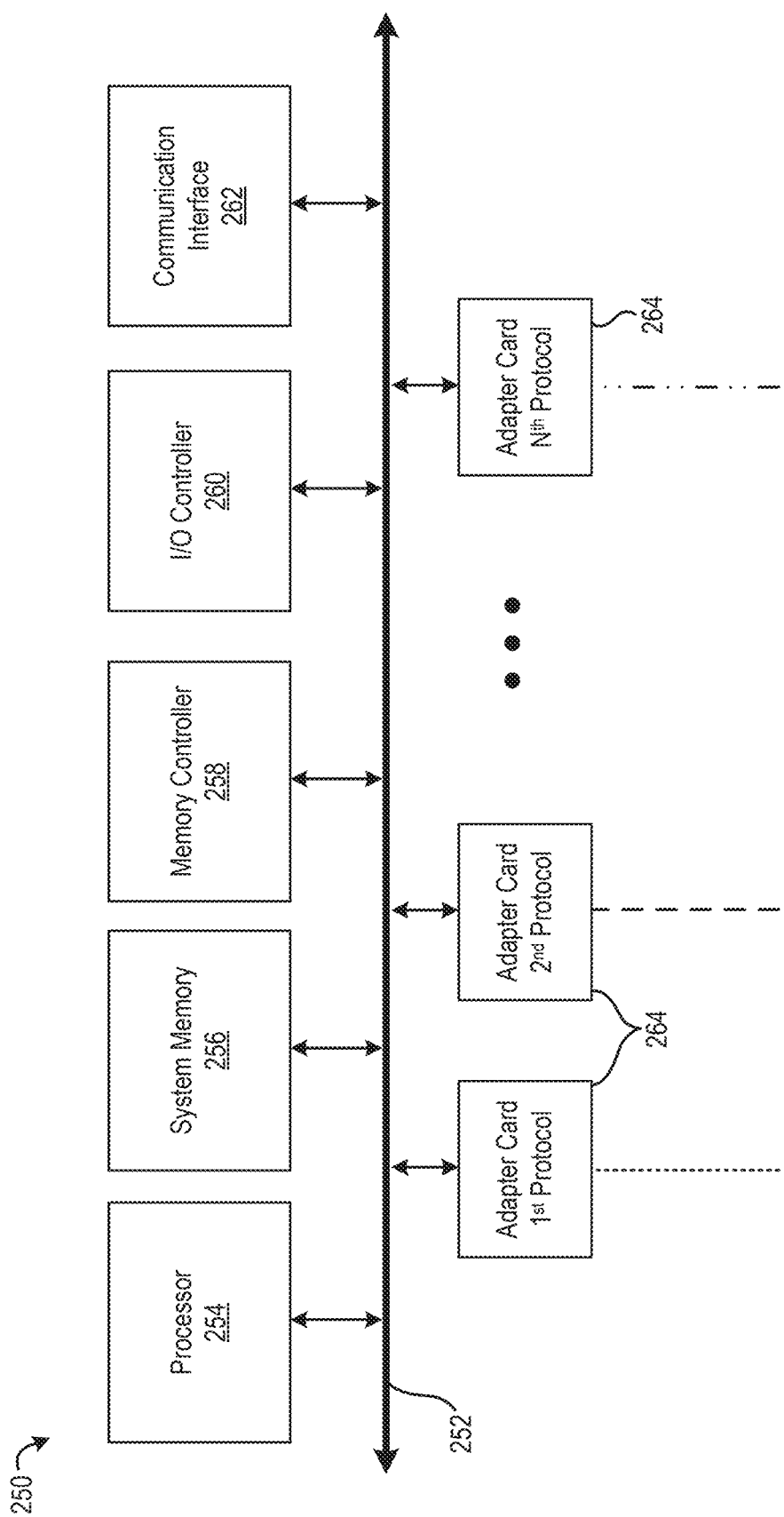
FIG. 2B is a partial detailed view of a system having a distributed architecture, in accordance with one approach.

Looking now to FIG. 2B, a partial view of a system 250 having a distributed architecture is illustrated in accordance with one approach. As an option, the present system 250 may be implemented in conjunction with features from any other approach listed herein, such as those described with reference to the other FIGS., such as FIG. 2A. However, such system 250 and others presented herein may be used in various applications and/or in permutations which may or may not be specifically described in the illustrative approaches or implementations listed herein. Further, the system 250 presented herein may be used in any desired environment. Thus FIG. 2B (and the other FIGS.) may be deemed to include any possible permutation.

As shown, the system 250 includes a communication infrastructure 252 that connects a number of components to a desired number of adapter cards 264 that each correspond to different protocols. For instance, the communication infrastructure 252 is shown as being connected to a processor 254, system memory 256, a memory controller 258, an I/O controller 260, and a communication interface 262. The processor 254 may be configured to control a remainder of the components that are connected to the communication infrastructure 252 (e.g., serve as a central processor). Moreover, the memory controller 258 is preferably configured to control at least the system memory 256. In some approaches, the memory controller 258 may be configured to issue data read operations, new data write operations, data modification operations, etc., or any other desired type of data operation that is implemented in the system memory 256.

The I/O controller 260 is preferably used to manage communication between the system 250 and external connections. According to an example, the I/O controller 260 may be used to orchestrate an exchange of information between the communication interface 262 and the memory controller 258 and/or processor 254. In some approaches, the I/O controller 260 includes and/or references AI based models that have been trained to evaluate I/O requests in real-time and dynamically identify hosts that are currently (or have been previously) SAN booted to each of the various LUNs within a storage device. For example, the I/O controller 260 includes models that have been trained to identify any operating systems on remote devices (e.g., connected to communication infrastructure 252) that have SAN booted from the LUNs in system memory 256, e.g., as would be appreciated by one skilled in the art after reading the present description.

With continued reference to FIG. 2B, the number, type, arrangement (e.g., order), configuration, etc., of the adapter cards 264 that are connected to the communication infrastructure 252 may vary depending on the desired approach. As noted above, each of the adapter cards 264 are shown as corresponding to a different protocol. In other words, each adapter card 264 provides a channel through which a respective remote location may establish contact with the communication infrastructure 252 and/or any of the components in system 250 while observing (e.g., adhering to) one or more protocols. It follows that depending on the approach, one or more of the adapter cards 264 may correspond to (e.g., support) nonvolatile memory express (NVMe), NVMe over Fabrics, remote direct memory access (RDMA) networks, Fibre Channel, Internet Small Computer Systems Interface (iSCSI), iSCSI Extensions for RDMA (iSER), etc. However, it should be noted that approaches herein may be trained and configured to support any protocol(s) that would be apparent to one skilled in the art after reading the present description, e.g., including vendor property protocols.

Figure 3A:
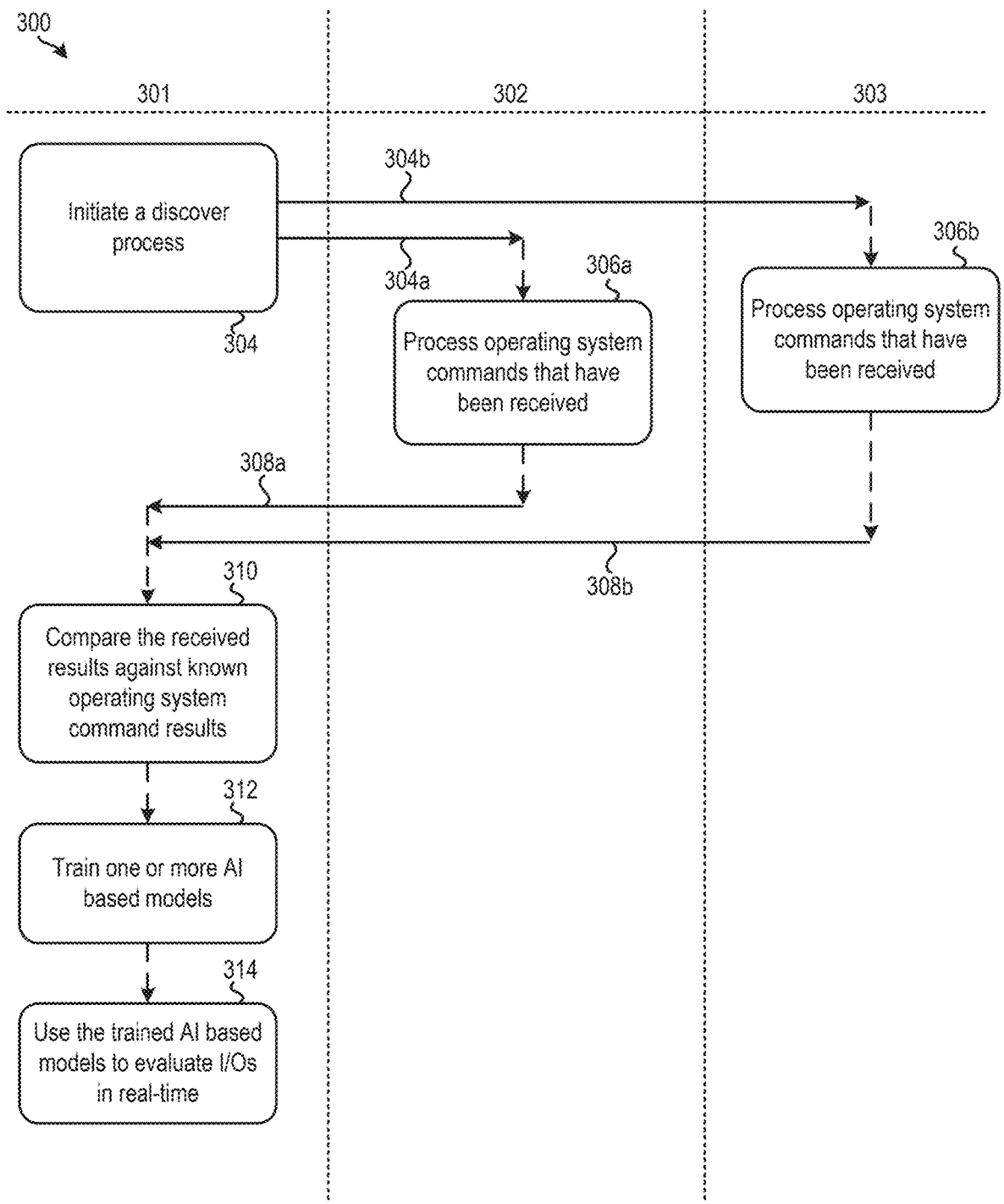
FIG. 3A is a flowchart of a method, in accordance with one approach.

Looking now to FIG. 3A, a flowchart of a computer-implemented method 300 for identifying and managing remote hosts that have SAN booted operating systems from data storage, is illustrated in accordance with one approach. As shown, the operations of method 300 involve developing static and long-term heuristics that outline the historical relationships. Moreover, these developed heuristics and related information are used to train AI based models such that the models are configured to automatically identify hosts that have booted an operating system over a network.

The method 300 may be performed in accordance with the present invention in any of the environments depicted in FIGS. 1-2B, among others, in various approaches. Of course, more or less operations than those specifically described in FIG. 3A may be included in method 300, as would be understood by one of skill in the art upon reading the present descriptions. Each of the steps of the method 300 may be performed by any suitable component of the operating environment. For example, the nodes 301, 302, 303 shown in the flowchart of method 300 may correspond to one or more processors positioned at a different location in a distributed data storage system. Moreover, each of the one or more processors are preferably configured to communicate with each other.

In various approaches, the method 300 may be partially or entirely performed by a controller, a processor, etc., or some other device having one or more processors therein. The processor, e.g., processing circuit(s), chip(s), and/or module(s) implemented in hardware and/or software, and preferably having at least one hardware component may be utilized in any device to perform one or more steps of the method 300. Illustrative processors include, but are not limited to, a central processing unit (CPU), an application specific integrated circuit (ASIC), a field programmable gate array (FPGA), etc., combinations thereof, or any other suitable computing device known in the art.

As mentioned above, FIG. 3A includes different nodes 301, 302, 303, each of which represent one or more processors, controllers, computer, etc., positioned at a different location in a distributed system. For example, in some approaches one or more of the operations in method 300 may involve components that correspond to one or more hosts, which may be booted from memory at a central server over a SAN. Accordingly, node 301 may include one or more processors which are located at a central server of a distributed system (e.g., see processor 212 of FIG. 2A). Moreover, node 302 may include one or more processors at a host location which are configured to manage a first operating system (e.g., see host device 204 of FIG. 2A). Furthermore, node 303 may include one or more processors which are located at a host location which are configured to manage a second operating system (e.g., see edge node 206 of FIG. 2A). Accordingly, commands, code, data, metadata outlining code updates, etc., may be sent between the nodes 301, 302, 303 depending on the approach. It should also be noted that the various processes included in method 300 are in no way intended to be limiting, e.g., as would be appreciated by one skilled in the art after reading the present description. For instance, data sent from node 302 to node 301 may be prefaced by a request sent from node 301 to node 302 in some approaches.

Looking now to operation 304, method 300 includes initiating a discover process. In other words, operation 304 includes beginning to develop heuristics that outline the historical relationships between hosts and the respective memory from which each are and/or has been booted. Operation 304 may thereby be performed by sending various different operating system commands to hosts that are currently SAN booted from an accessible memory location, and evaluating the responses that are received. Operation 304 may also include causing various operating system commands to be sent to hosts that attempt to SAN boot from memory during the discover process.

The operating system commands that are sent to the hosts SAN booted from given memory locations in operation 304 may include, but are in no way limited to, WINDOWS programming commands (e.g., such as ipconfig, nslookup, tracert, netstat, etc.); LINUX programming commands (e.g., such as lscfg, -vpl, prtconf, mkdir, etc.); etc. The number, type, combination, etc. of operating system commands that are sent may be determined based on the hosts being evaluated, past performance experienced, input received from an administrator, industry standards, network type, etc.

Accordingly, FIG. 3A illustrates various operating system commands (e.g., instructions) being sent from node 301 to each of nodes 302 and 303. See 304a, 304b. At each of nodes 302, 303, the various operating system commands that have been received are processed. See operations 306a, 306b. Accordingly, the operating system commands are evaluated and executed. Depending on the types of operating system commands that have been issued from node 301, nodes 302, 303 may involve performing various steps to actually complete the commands that are received. Thus, while operations 306a, 306b are shown as a single step at nodes 302, 303 respectively, any desired sub-operations may be performed, e.g., as would be appreciated by one skilled in the art after reading the present description.

Moreover, operations 308a, 308b involve returning information produced as a result of satisfying the operating system commands at nodes 302, 303. In other words, operation 308a involves returning any information (e.g., metadata, data, sensor readings, etc.) that is produced as a result of satisfying the operating system commands originally sent from node 301. In response to receiving the results sent from nodes 302, 303 at node 301, method 300 advances to operation 310. There, operation 310 includes comparing the received results against known operating system command results. In other words, operation 310 includes evaluating information received from the hosts at nodes 302, 303 in response to the operating system commands sent there, and determining whether the information matches anticipated responses to the commands. The received information may thereby be compared against known operating system command results.

According to an in-use example, which is in no way intended to be limiting, an initial power shell operating system command (e.g., "Get-ComputerInfo") may be issued from node 301 to node 302. In this example, the command is a WINDOWS POWERSHELL version 7.3 command that utilizes .Net 7.0. Thus, in response to receiving all of the operating system properties from node 302 back at node 301, it can be determined that the host is using a WINDOWS operating system, along with each of the pretendent WINDOWS parameters. Armed with these parameters, node 301 may be able to send additional power shell commands to node 302 in order to gather supplemental information. While not shown in FIG. 3A, it follows that additional operating system commands (e.g., instructions) may be sent from node 301 to node 302 to collect additional information and/or based on the responses received from node 302. For instance, in situations where there is no response to an issued Get-Computerinfo command and/or a negative response (e.g., such as not supported) is received, approaches herein may continue investigating by sending supplemental commands, e.g., such as lower and/or higher versions of other power shell commands. Any positive responses may thereby result in the apparatus sending additional operating level specific commands to gather additional information. However, in situations where each WINDOWS operating system command fails, commands corresponding to different operating systems (e.g., LINUX) may be issued, e.g., as described in further detail below in FIG. 3B.

With continued reference to FIG. 3A, method 300 advances to operation 310 in response to receiving operating system command results from nodes 302, 303. There, operation 310 includes creating historical relationships between the hosts and the respective memory from which each host is and/or has been booted from over one or more networks. In other words, operation 310 includes developing an accurate understanding of each instance a host boots an operating system from a remote memory location over a network (e.g., SAN, LAN, etc.). Moreover, this understanding is developed using the information received from the hosts themselves, along with the known operating system command results. In some approaches, known operating system command results may be developed based on an understanding of one or more protocols being observed. For example, adapter cards may be used to establish SAN booting relationships between a memory location and remote hosts. Each of the adapter cards may further correspond to (e.g., support) a respective protocol, e.g., such as NVMe, NVMe over Fabrics, RDMA networks, Fibre Channel, iSCSI, iSER, etc. Understanding how each protocol operates and the corresponding notifications may thereby provide insight that can be used to evaluate the responses that are received from the hosts.

These historical relationships may also be updated over time. For instance, responses to operating system commands that are received in the course of normal operation may be compared against responses previously received from the same hosts, the same types of hosts, attempts to boot to the same operating systems, other operating systems at about the same time, etc. It follows that the historical relationships that are developed offer static and long-term heuristics that outline the historical relationships between hosts, the memory storing the operating systems, and/or the networks that facilitate the remote booting.

These developed heuristics and related information may thereby be used to train AI based models. For instance, method 300 advances from operation 310 to operation 312. There, operation 312 includes training one or more AI based models such that they are configured to identify hosts that have SAN booted. In other words, operation 312 includes using the developed historical relationships to train AI based models to identify devices that have booted from a remote location over a network. The AI models may further be trained to flag certain network and/or memory components for replacement in order to improve performance, e.g., as will be described in further detail below.

Advancing to operation 314 from operation 312, there, operation 314 includes using the trained AI based models to evaluate I/Os in real-time. In other words, operation 314 includes evaluating existing and proposed relationships between hosts and the memory locations storing the operating systems that are being remote booted by the hosts. In other words, operation 314 includes causing the trained AI based models to monitor system operations in real-time and identify changes that may impact performance and/or configuration of the system as a whole, e.g., as will be described in further detail below.

Figure 3B:
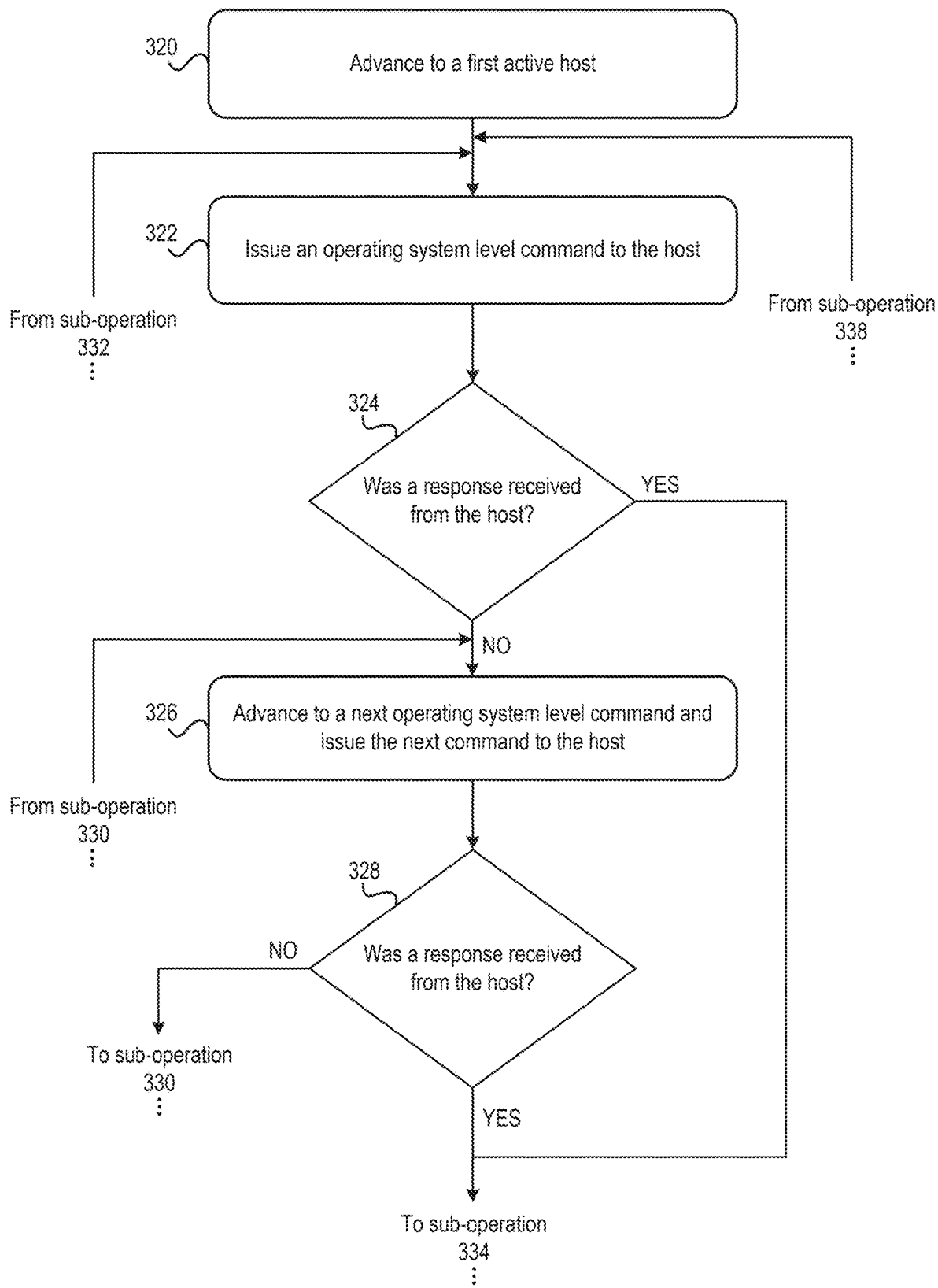
FIG. 3B is a flowchart of a sub-operations for one or more of the operations in the method of FIG. 3A, in accordance with one approach.
Figure 3B:
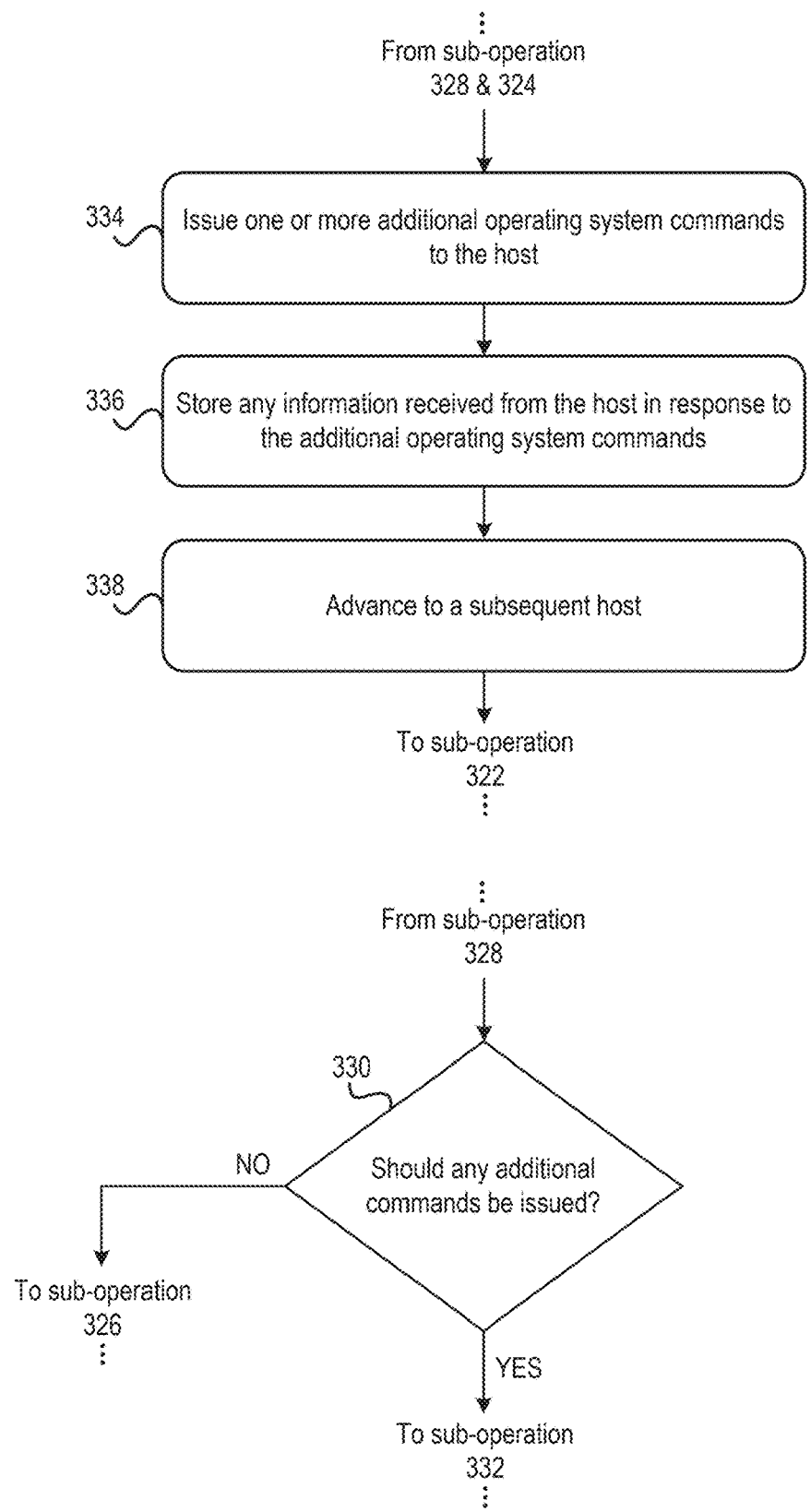
Figure 3B:
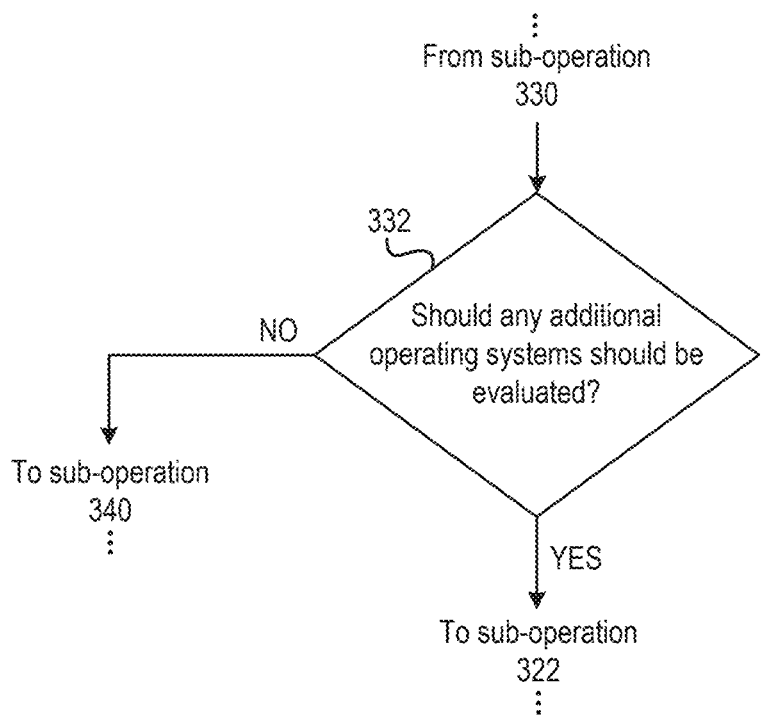

Referring momentarily now to FIG. 3B, exemplary sub-operations of performing a discover process are illustrated in accordance with one approach. It follows that these sub-operations may be used to perform one or more of operations 304, 304a, 304b, 306a, 306b, 308a, and/or 308b in FIG. 3A. However, it should be noted that the sub-operations of FIG. 3B are illustrated in accordance with one approach which is in no way intended to be limiting.

As shown, sub-operation 320 includes advancing to a first active host. In other words, sub-operation 320 includes inspecting one of the hosts that are connected to a given central location. In some approaches, sub-operation 320 includes identifying each of the hosts that are currently booted from a remote memory location over a network and storing the hosts in a queue. Moreover, the "first" active host may be determined randomly, based at least in part on a host hierarchy, based at least in part on a type of operating system each host is booted from, etc.

From sub-operation 320, the flowchart proceeds to sub-operation 322. There, sub-operation 322 includes issuing an operating system level command to the host identified in sub-operation 320. The specific command that is issued to the host may vary depend on a number of factors. For instance, the issued command may correspond to an operating system currently being compared to the host. According to an example, the command sent in sub-operation 322 is a WINDOWS based operating system command.

Proceeding to sub-operation 324, there a determination is made as to whether the operating system level command resulted in a response from the target host. In response to determining that a response was not received from the host, the flowchart proceeds from sub-operation 324 to sub-operation 326. There, sub-operation 326 includes advancing to a next operating system level command, and issuing the next command to the host. Depending on the approach, the "next" operating system level command may be selected randomly, according to a predetermined order, based on responses to previous commands, based on real-time data, according to instructions received from an administrator, etc.

From sub-operation 326, the flowchart proceeds to sub-operation 328. There, sub-operation 328 includes determining whether a response was received from the host. In other words, sub-operation 328 includes determining whether the "next" operating system level command sent in sub-operation 326 resulted in any information being received from the host. In response to determining that no response was received from the host, the flowchart proceeds from sub-operation 328 to sub-operation 330. There, sub-operation 330 includes determining whether any additional commands corresponding to the current operating system should be issued.

For example, sub-operation 330 may include determining whether any additional WINDOWS operating system level commands should be issued to the host. In some approaches, sub-operation 330 determines how many WINDOWS operating system level commands have already been issued. Sub-operation 330 may also determine how many WINDOWS operating system level commands have not been responded to by the current host. In still other approaches, sub-operation 330 may be based at least in part on the responses that are received from the host, e.g., such as incorrect responses, failed requests, etc.

In response to determining that no additional commands corresponding to the current operating system should be issued, the flowchart proceeds from sub-operation 330 to sub-operation 332. There, sub-operation 332 includes determining whether any additional operating systems should be evaluated. In other words, sub-operation 332 includes determining whether commands corresponding to a different operating system should be issued. According to another example, which is in no way intended to be limiting, in response to determining that no additional WINDOWS commands should be issued to a host, sub-operation 332 may determine whether one or more LINUX commands should be issued to the host.

In response to determining commands corresponding to at least one additional operating system should be issued to the host, the flowchart is shown as returning to sub-operation 322. There, sub-operation 322 includes issuing a command corresponding to the additional (e.g., new) operating system to the host identified in sub-operation 320. As noted above, the specific command that is issued to the host may vary depend on a number of factors. For instance, the command that is issued may be determined based on the previous operating system evaluated and/or whether the host responded to any of the corresponding commands that were issued. It follows that a number of the sub-operations in FIG. 3B may be repeated in an iterative fashion for different operating systems, different commands of a given operating system, and/or different hosts, e.g., as will be described in further detail below.

Returning to sub-operation 332, the flowchart alternatively advances to sub-operation 340 of FIG. 3C in response to determining that no additional operating system commands should be issued to the hosts, e.g., as will be described in further detail below. Moreover, returning to sub-operation 330, the flowchart returns to sub-operation 326 in response to determining that additional commands corresponding to the current operating system should be issued to the host. In other words, the flowchart returns to sub-operation 326 in response to determining that additional WINDOWS commands should be issued to the host in an attempt to collect information therefrom. In response to returning to sub-operation 326, a next command corresponding to the same operating system is issued (e.g., sent) to the host. The "next" operating system level command issued to the host may depend on the previous response received from the host, the last operating system level command that was issued, the specific operating system, etc.

Returning now to sub-operation 328, the flowchart advances to sub-operation 334 in response to determining that a response to the command sent in sub-operation 326, was actually received from the host. In other words, the flowchart advances to sub-operation 334 in response to determining that the operating system level command sent to the host resulted in a positive response that conveys useful information. There, sub-operation 334 includes issuing one or more additional operating system commands to the respective host. In other words, sub-operation 334 includes issuing between 1 and "N" different operating system commands that supplement the operating system command originally sent to the host in sub-operation 326.

The additional operating system commands sent in sub-operation 334 preferably supplement the operating system command originally sent to the host in sub-operation 326. The additional operating system commands may thereby be selected based at least in part on information received from the host, other performance information, protocol notifications, etc. Moreover, "N" may have the value of any desired positive number that is predetermined by a host, based on performance data received in real-time, determined using past performance and/or relationships, etc. In one exemplary approach, the value of N may be between 2 and 1000, preferably between about 10 and about 500, more preferably between about 25 and 250, but could be any desired value, e.g., depending on the operating system, results generated by AI based models, received instructions, etc.

Sub-operation 336 further includes storing any information received from the host in response to the additional operating system commands sent in sub-operation 334. These responses are also preferably combined with any responses received from the host in response to the initial command sent in sub-operation 326. Sub-operation 336 may thereby involve developing (e.g., adding to) historical relationships between hosts and different operating system level commands. In other words, fingerprints that describe how certain hosts have interacted with different operating systems may begin to be developed, e.g., as will be described in further detail below. From sub-operation 336, the flowchart proceeds to sub-operation 338. There, sub-operation 338 includes advancing to a subsequent host, before returning to sub-operation 322. This allows for the various sub-operations of FIG. 3B to be repeated for the subsequent host.

Figure 3C:
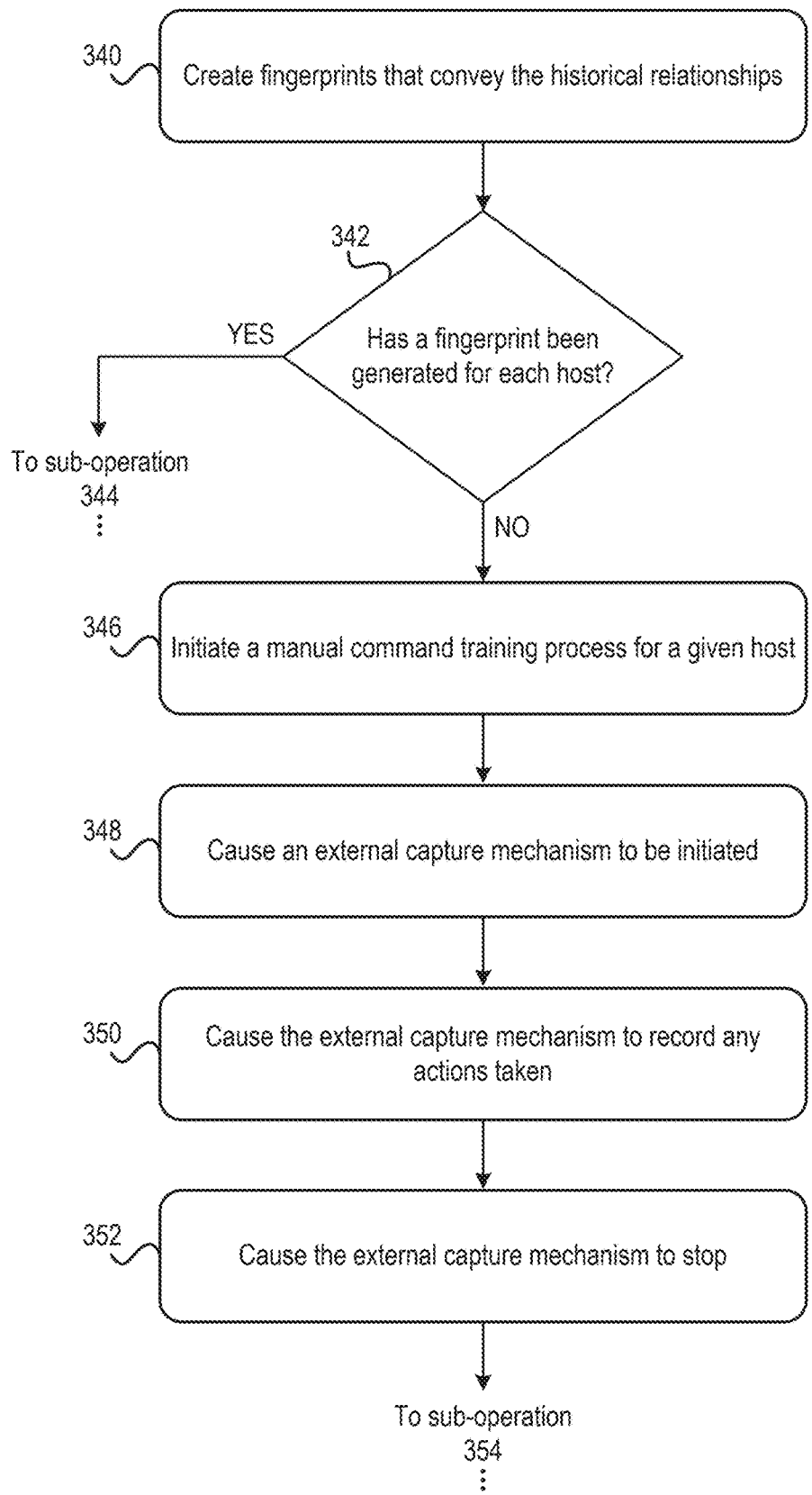
FIG. 3C is a flowchart of a sub-operations for one or more of the operations in the method of FIG. 3A, in accordance with one approach.
Figure 3C:
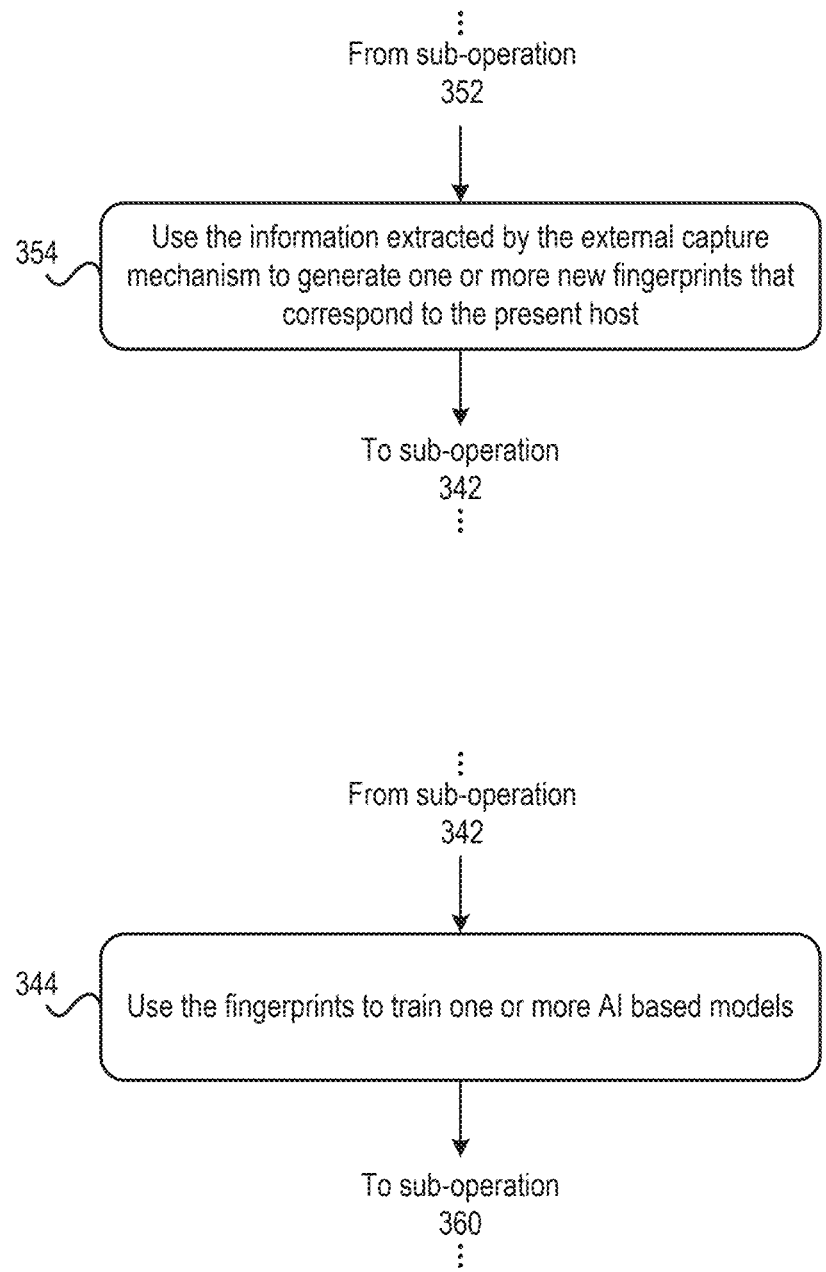

Looking now to FIG. 3C, exemplary sub-operations of performing a discover process are illustrated in accordance with another approach. It follows that these sub-operations may be used to perform one or more of operations 304, 304a, 304b, 306a, 306b, 308a, and/or 308b in FIG. 3A. However, it should be noted that the sub-operations of FIG. 3C are illustrated in accordance with one approach which is in no way intended to be limiting.

As shown, sub-operation 340 includes creating fingerprints that convey the historical relationships between various hosts and memory from which the hosts have booted an operating system from over one or more networks. In other words, sub-operation 340 includes developing an accurate understanding of how different hosts may boot from a remote memory location over a SAN, LAN, etc. The fingerprints may be generated from different sources of information. For instance, in some approaches predetermined data standards may be converted into identifiable characteristics that are then combined into unique fingerprints. In other approaches, product information associated with the hosts, memory storing the operating systems, and/or networks may be referenced to develop the fingerprints. Moreover, the product information may be publicly available, secured from private storage, determined over time, etc.

Each fingerprint may further be correlated with a respective host. Accordingly, these fingerprints are further developed in some approaches using information received from the hosts themselves over time and/or known operating system command results. As noted above, known operating system command results may be developed based on an understanding of one or more protocols being observed. For example, adapter cards may be used to establish SAN booting relationships between a memory location and remote hosts. Each of the adapter cards may further correspond to (e.g., support) a respective protocol, e.g., such as NVMe, NVMe over Fabrics, RDMA networks, Fibre Channel, iSCSI, iSER, etc. Understanding how each protocol operates and the corresponding notifications may thereby provide insight that can be used to develop the fingerprints associated with the hosts.

From sub-operation 340, the flowchart proceeds to sub-operation 342. There, sub-operation 342 includes determining whether one or more fingerprints have been generated for each of the hosts. In other words, sub-operation 342 includes determining whether each host has been inspected and information associated with each of the hosts has been collected. As noted above, fingerprints and other insight about hosts, memory from which operating systems are booted, networks over which the operating systems are booted, etc., may be used to train one or more AI based models to perform analysis, generate responses, and cause action to be taken, e.g., as will be described in further detail below.

In response to determining that one or more fingerprints have been generated for each of the hosts, the flowchart proceeds from sub-operation 342 to sub-operation 344. There, sub-operation 344 includes using the fingerprints to train one or more AI based models to evaluate I/O requests in real-time and dynamically identify hosts that have booted operating systems from respective LUNs within a storage device. For example, the AI based models may be trained to identify any operating systems on remote devices that have SAN booted from the LUNs in system memory, e.g., as would be appreciated by one skilled in the art after reading the present description. The AI based models are thereby also trained such that they are configured to identify relationship changes between hosts, the memory locations from which the hosts boot operating systems, and/or the networks over which the operating systems are booted. For example, the AI based models may be trained to identify operating system shut-downs, reimages, logical unit number reassignments, etc., or similar relationship changes.

From sub-operation 344, the flowchart proceeds to sub-operation 360 of FIG. 3D, e.g., as will be described in further detail below. Returning now to sub-operation 342 of FIG. 3C, the flowchart proceeds to sub-operation 346 in response to determining that one or more fingerprints have not yet been generated for at least one host. There, sub-operation 346 includes initiating a manual command training process for a given host. In other words, sub-operation 346 commences the process of manually adding fingerprints that correspond to a specific host, to a repository (e.g., database). It follows that various sub-operations in the flowchart of FIG. 3C may be repeated in an iterative fashion for each relevant host.

Advancing, sub-operation 348 includes causing an external capture mechanism to be initiated. In some approaches, the external capture mechanism includes a packet capture mechanism. The external capture mechanism may thereby be configured to capture and store data packets as they travel through a network. Moreover, the external capture mechanism may use components including switches, test access points (TAPs), Switched Port Analyzers (SPANs), etc., to actually make copies of packets. In other approaches, the external capture mechanism may include frame capture mechanisms, capsule capture mechanisms, etc., or any other desired type of external capture mechanisms.

From sub-operation 348, the flowchart proceeds to sub-operation 350. There, sub-operation 350 includes causing the external capture mechanism to record any actions taken. The external capture mechanism is thereby preferably able to extract relevant information from boot requests to memory locations over networks. For example, sub-operation 350 may include determining (e.g., extracting) host information, the type of boot request issued by the host, the destination for the boot request, configuration details, protocol compliance information, etc.

Referring still to FIG. 3C, the flowchart advances from sub-operation 350 to sub-operation 352. There, sub-operation 352 includes causing the external capture mechanism to stop. The flowchart may advance to sub-operation 352 in response to a predetermined amount of time passing, a predetermined number of boot attempts being detected, a time-out, experiencing a failure, etc. In other approaches, the flowchart advances to sub-operation 352 in response to capturing a desired amount of information. Moreover, sub-operation 354 includes using the information extracted by the external capture mechanism to generate one or more new fingerprints that correspond to the present host. In some approaches, sub-operation 354 includes translating the information extracted by the external capture mechanism into a specific digital format before creating the new fingerprint(s). This may allow for the newly acquired information to be used to retrain one or more AI based models. Thus, as relationships between hosts, memory locations storing operating systems being booted to, and networks that allow for the remote booting to occur, may be easily monitored over time, and used to make predictions (e.g., take preventative actions).

Figure 3D:
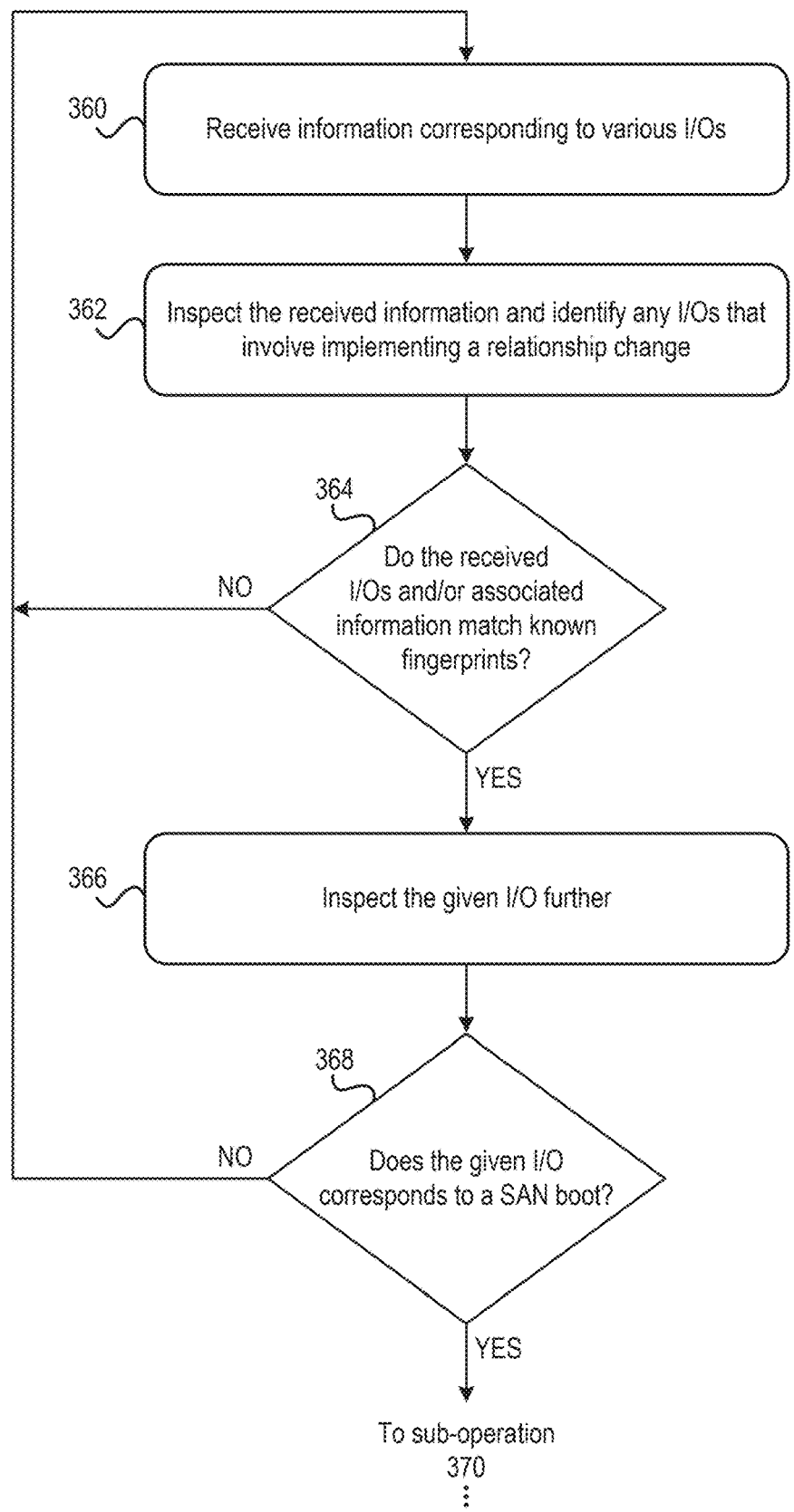
FIG. 3D is a flowchart of a sub-operations for one or more of the operations in the method of FIG. 3A, in accordance with one approach.
Figure 3D:
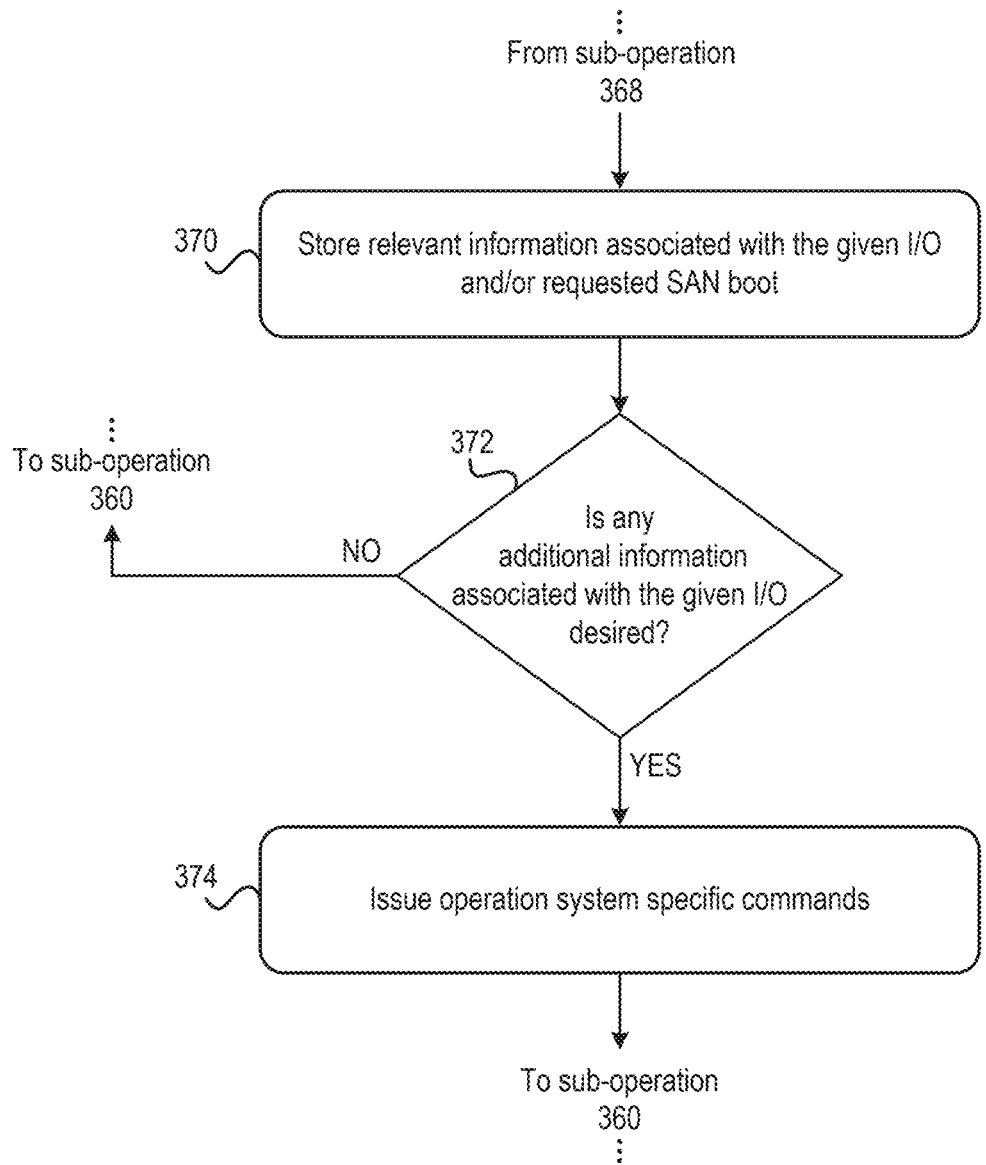

Looking now to FIG. 3D, exemplary sub-operations of evaluate I/O requests in real-time and dynamically identify hosts that have booted operating systems from respective LUNs in storage are illustrated in accordance with another approach. It follows that these sub-operations may be used to perform one or more of operations 310, 312, and/or 314 in FIG. 3A. However, it should be noted that the sub-operations of FIG. 3D are illustrated in accordance with one approach which is in no way intended to be limiting.

As shown, sub-operation 360 includes receiving information corresponding to various I/Os. For instance, in some approaches the information received includes command requests that correspond to the I/Os. Moreover, the command requests may be configured to indicate vendor specific codes that may be used in command line interface (CLI) commands. According to an example, each command request may include one or more bytes in a dedicated field (e.g., known location) that indicate the vendor specific codes.

Proceeding to sub-operation 362, the received information is inspected and any I/Os that involve implementing a relationship change are identified. The received information is thereby preferably inspected to determine whether any of the I/Os involve implementing relationship changes that impact a host. In other words, sub-operation 362 evaluates the I/Os in order to determine whether any of them are of a predetermined type, e.g., such as operating system shut-downs, reimages, logical unit number reassignments, etc., or similar relationship changes. For instance, one or more AI based models may be trained to inspect the received information and make correlations with known fingerprints identified while developing static and long-term heuristics that outline the historical relationships shared by hosts, memory locations, and networks. Thus, the AI based models may also be trained to identify hosts that have booted operating systems from memory. In some approaches, sub-operation 362 involves performing a fast initial inspection of the I/Os received in sub-operation 360. This allows for I/Os to be evaluated in real-time as they are received. Depending on the approach, this initial fast inspection may involve evaluating frames, packets, capsules, etc., that are associated with each of the received I/Os.

Proceeding to sub-operation 364, a determination is made as to whether any of the received I/Os and associated information match any known fingerprints. As noted above, the fingerprints described herein may be considered collections of identifying characteristics that outline how respective hosts respond to different operating system commands that are issued. Thus, in response to determining that the received I/Os do not match any known fingerprints, the flowchart is shown as returning to sub-operation 360. This allows for incoming I/Os to continue to be monitored by trained AI based models for matches with known fingerprints.

However, the flowchart proceeds from sub-operation 364 to sub-operation 366 in response to determining that one or more of the received I/Os does match at least one known fingerprint. There, sub-operation 366 includes inspecting the given I/O further. As noted above, the inspection performed in sub-operation 362 is preferably done in real-time to avoid any latency. Sub-operation 366 thereby provides an opportunity to perform a deeper inspection of the respective packets, frames, capsules, etc., that are associated with each identified fingerprint match.

According to some approaches, sub-operation 366 includes issuing one or more additional operating system commands to the host that issued the given I/O. In other words, sub-operation 366 includes issuing between 1 and "N" different operating system commands that supplement the given I/O. The additional operating system commands may thereby be selected based at least in part on information received from the host, other performance information, protocol notifications, etc. As noted above, "N" may have the value of any desired positive number that is predetermined by a host, based on performance data received in real-time, determined using past performance and/or relationships, etc.

In response to performing the supplemental inspection of the given I/O(s), the flowchart advances to sub-operation 368. There, sub-operation 368 includes determining whether the given I/O corresponds to a SAN boot. In other words, sub-operation 368 determines whether the given I/O involves a request to boot an operating system from a LUN in memory over a network. As shown, the flowchart returns to sub-operation 360 from sub-operation 368 in response to determining that the given I/O does not correspond to a SAN boot. However, the flowchart proceeds to sub-operation 370 in response to determining that the given I/O does correspond to a SAN boot. There, sub-operation 370 includes storing all relevant information associated with the given I/O and/or requested SAN boot. Information identified (e.g., received from a host) in response to the supplemental operating system commands issued in sub-operation 366 may also be stored.

Sub-operation 372 further includes determining whether any additional information associated with the given I/O is desired. In other words, sub-operation 372 includes determining whether the amount of information known about the given I/O is sufficient to create a new fingerprint. In response to determining that additional information associated with the given I/O is desired, the flowchart proceeds to sub-operation 374. There, sub-operation 374 includes issuing operating system specific commands. In preferred approaches, sub-operation 374 includes issuing between 1 and "M" operating system specific commands. With respect to the present description, the operating system specific commands are preferably configured to obtain an updated understanding of the relationship between the respective host that issued the given I/O, the memory location storing the operating system the given I/O attempts to boot, and/or the network over which the I/O attempts to conduct the boot. In other words, the 1 to M operating system specific commands are configured to gain a more detailed understanding of the specifics correlated with the given I/O, the LUN in memory at which the operating system attempting to be booted, the network on which the boot is attempting to be made, etc. It should also be noted that "M" may have the value of any desired positive number that is predetermined by a host, based on performance data received in real-time, determined using past performance and/or relationships, etc. In one exemplary approach, the value of M may be between 2 and 1000, preferably between about 10 and about 500, more preferably between about 25 and 250, but could be any desired value, e.g., depending on the operating system, results generated by AI based models, received instructions, etc.

It follows that information received in response to the operating system specific commands issued may supplement any existing (known) information that corresponds to the same given I/O. Depending on the approach, the combined information may be used to develop one or more new fingerprints in a database, supplement one or more existing fingerprints in a database, remove and/or replace one or more existing fingerprints in a database, etc.

It follows that approaches herein include discovering and reporting hosts that are currently or have been previously SAN booted to each of the various LUNS within a storage device. As noted above, this information becomes particularly desirable in situations that involve reboot, upgrades to operating systems, decommission storage, etc. For example, the accurate understanding of active remote boots may be used to prevent any accidental deletion (e.g., cleanup) of existing relationships that are being utilized. The historical relationships developed by approaches herein may thereby be maintained and updated over time such that the relationships may be referenced while repairing after a reboot, operating system upgrade/update, etc. Currently, there is no automated or time efficient manual method to determine which hosts are currently SAN booted from a particular storage device, and there is currently no method of obtaining any historical relationships therebetween. Information outlining these historical relationships becomes particularly desirable in situations where hosts are temporally SAN booted to different operating systems, e.g., for a short period of time. According to an example, a business may have an application that only runs on an old operating system, and the application is only used once a month to run a monthly report. In this example a respective host would request to SAN boot to the old operating system for a matter of hours or days, before SAN booting back to a newer operating system. Conventional products have no way of identifying or even knowing this temporary monthly booting occurs.

It follows that approaches herein are able to achieve a number of desirable improvements, e.g., such as reduced power consumption, reduced heat production, lower server capex, more efficient use of storage capacity, increased availability, rapid disaster recover, centralized server management, improved performance, etc.

Moreover, by implementing AI models that have been trained to evaluate I/Os in real-time and discover hosts attempting to boot operating systems from LUNs in a storage device, performance may further be improved. For example, the AI based models may be trained to identify any operating systems on remote devices that have SAN booted from the LUNs in system memory, e.g., as would be appreciated by one skilled in the art after reading the present description. The AI based models are thereby also trained such that they are configured to identify relationship changes between hosts, the memory locations from which the hosts boot operating systems, and/or the networks over which the operating systems are booted. For example, the AI based models may be trained to identify operating system shutdowns, reimages, logical unit number reassignments, etc., or similar relationship changes.

In some approaches, one or more AI based models may be trained to identify relationship changes between the hosts, the memory storing the operating systems, and/or the networks that facilitate the remote booting. For example, the AI models may be trained to identify I/Os that involve (e.g., request) operating system shut-downs, reimages, host/logical unit relationship changes, etc. The AI based models are also preferably trained to compare identified relationship changes against known fingerprints associated with the various hosts. Again, the fingerprints described herein may be considered fingerprints (e.g., collections of identifying characteristics) that outline how respective host operating systems respond to the operating system commands that are issued.

In response to determining the identified relationship change does not match one of the known fingerprints, the AI models are trained to determine what changed by issuing between 1 and N additional operating system commands to each of the respective hosts. The AI models are also trained such that they are configured to automatically compare the additional information received from the hosts in response to the additional operating system commands that were issued. Moreover, the received additional information is preferably compared against known fingerprints.

In response to the additional information matching one or more of the known fingerprints, the AI models are also trained to issue between 1 and M operating system specific commands. As noted above, the operating system specific commands are preferably configured to obtain an updated understanding of the relationship between the respective host, the memory location storing the operating system, and the network facilitating the boot. In other words, the 1 to M operating system specific commands are configured to gain a more detailed understanding, e.g., as would be appreciated by one skilled in the art after reading the present description. Moreover, the operating system specific commands are preferably issued to the host corresponding to the one of the known fingerprints that matches the additional information.

The AI based models are further trained to use information received from the corresponding host in response to the operating system specific commands to update the known fingerprints that matches the additional information. The AI based models are also trained to generate at least one new known fingerprint in response to the additional information not matching any of the known fingerprints. The AI based models can also be trained to initiate dynamic retraining of the AI based model(s) to incorporate the at least one new known fingerprint. The AI based models may also be retrained as a result of a sufficient amount of supplemental information being added to existing known fingerprints. Thus, in response to determining the identified relationship change matches one of the known fingerprints, the AI models may also be configured to update the one of the known fingerprints to incorporate (e.g., reference) the identified relationship change. In other words, updating the known fingerprint to incorporate the new datapoint (identified relationship change). Again, it follows that the updated fingerprint information may be used to retrain the AI based model periodically.

It should be noted that the way that information is input as described herein may vary depending on the approach. For example, information may be input using a text document and/or a GUI. However, the process of training the AI based models to match operating system specific command(s) with a fingerprint that provides a training template. For example, an apparatus may include a high-level command called "get all available logical units". However, the process for getting logical units varies from operating system to operating system. For instance, operating systems using a SCSI protocol would issue 5 SCSI commands, but an operating system implementing a FC-NVMe protocol will involve issuing many different commands. It follows that the approaches herein are desirably able to improve the efficiency by which operating systems may be remote booted over a network.

It will be clear that the various features of the foregoing systems and/or methodologies may be combined in any way, creating a plurality of combinations from the descriptions presented above.

It will be further appreciated that implementations of the present invention may be provided in the form of a service deployed on behalf of a customer to offer service on demand.

The descriptions of the various implementations of the present invention have been presented for purposes of illustration, but are not intended to be exhaustive or limited to the implementations disclosed. Many modifications and variations will be apparent to those of ordinary skill in the art without departing from the scope and spirit of the described implementations. The terminology used herein was chosen to best explain the principles of the implementations, the practical application or technical improvement over technologies found in the marketplace, or to enable others of ordinary skill in the art to understand the implementations disclosed herein.

What is claimed is:

1. A computer-implemented method (CIM), comprising:
    sending multiple different operating system commands to hosts connected to a storage area network (SAN);
    comparing information received from the hosts in response to the operating system commands, against known operating system command results;
    creating historical relationships between hosts and the SAN using the received information and the known operating system command results; and
    using the historical relationships to train an artificial intelligence (AI) based model to:
        identify relationship changes between the hosts and the SAN,
        in response to identifying a relationship change between the hosts and the SAN, compare the identified relationship change against known fingerprints,
        in response to determining the identified relationship change does not match one of the known fingerprints, issue between 1 and N additional operating system commands to the respective hosts, compare additional information received from the hosts in response to the additional operating system commands, against the known fingerprints, and in response to the additional information matching one of the known fingerprints, issue between 1 and M operating system specific commands.

2. The CIM of claim 1, wherein the operating system specific commands are issued to the host corresponding to the one of the known fingerprints that matches the additional information, wherein the AI based model is further trained to:

use information received from the corresponding host in response to the operating system specific commands to update the known fingerprints that matches the additional information.

3. The CIM of claim 1, wherein the AI based model is further trained to:

in response to the additional information not matching one of the known fingerprints, cause at least one new known fingerprint to be generated; and initiate a dynamic retraining of the AI based model to incorporate the at least one new known fingerprint.

4. The CIM of claim 1, wherein the AI based model is further trained to:

in response to determining the identified relationship change matches one of the known fingerprints, updating the one of the known fingerprints to incorporate the identified relationship change.

5. The CIM of claim 1, wherein the creating of the historical relationships between the hosts and the SAN includes using: the received information, the known operating system command results, and associated protocol(s).

6. The CIM of claim 5, wherein the associated protocol(s) is/are selected from the group consisting of: nonvolatile memory express (NVMe), NVMe over Fabrics, remote direct memory access (RDMA) networks, Fibre Channel, Internet Small Computer Systems Interface (iSCSI), and iSCSI Extensions for RDMA (iSER).

7. The CIM of claim 1, wherein the relationship change for the SAN is selected from the group consisting of: operating system shut-downs, reimages, and logical unit relationship changes.

8. The CIM of claim 1, wherein each of the hosts are connected to the SAN as a result of a respective SAN booting operation being performed to a respective logical unit number (LUN) in a physical storage device of the SAN.

9. A computer program product (CPP), comprising:

a set of one or more computer-readable storage media; and program instructions, collectively stored in the set of one or more storage media, for causing a processor set to perform the following computer operations:

send multiple different operating system commands to hosts connected to a storage area network (SAN);

compare information received from the hosts in response to the operating system commands, against known operating system command results;

create historical relationships between hosts and the SAN using the received information and the known operating system command results; and use the historical relationships to train an artificial intelligence (AI) based model to:

identify relationship changes between the hosts and the SAN, in response to identifying a relationship change between the hosts and the SAN, compare the identified relationship change against known fingerprints, in response to determining the identified relationship change does not match one of the known fingerprints, issue between 1 and N additional operating system commands to the respective hosts, compare additional information received from the hosts in response to the additional operating system commands, against the known fingerprints, and in response to the additional information matching one of the known fingerprints, issue between 1 and M operating system specific commands.

10. The CPP of claim 9, wherein the operating system specific commands are issued to the host corresponding to the one of the known fingerprints that matches the additional information, wherein the AI based model is further trained to:

use information received from the corresponding host in response to the operating system specific commands to update the known fingerprints that matches the additional information.

11. The CPP of claim 9, wherein the AI based model is further trained to:

in response to the additional information not matching one of the known fingerprints, cause at least one new known fingerprint to be generated; and initiate a dynamic retraining of the AI based model to incorporate the at least one new known fingerprint.

12. The CPP of claim 9, wherein the AI based model is further trained to:

in response to determining the identified relationship change matches one of the known fingerprints, updating the one of the known fingerprints to incorporate the identified relationship change.

13. The CPP of claim 9, wherein the creating of the historical relationships between the hosts and the SAN includes using: the received information, the known operating system command results, and associated protocol(s).

14. The CPP of claim 13, wherein the associated protocol(s) is/are selected from the group consisting of: nonvolatile memory express (NVMe), NVMe over Fabrics, remote direct memory access (RDMA) networks, Fibre Channel, Internet Small Computer Systems Interface (iSCSI), and iSCSI Extensions for RDMA (iSER).

15. The CPP of claim 9, wherein the relationship change for the SAN is selected from the group consisting of: operating system shut-downs, reimages, and logical unit relationship changes.

16. The CPP of claim 9, wherein each of the hosts are connected to the SAN as a result of a respective SAN booting operation being performed to a respective logical unit number (LUN) in a physical storage device of the SAN.

17. A computer system (CS), comprising:

a processor set;

a set of one or more computer-readable storage media;

program instructions, collectively stored in the set of one or more storage media, for causing the processor set to perform the following computer operations:

send multiple different operating system commands to hosts connected to a storage area network (SAN);

compare information received from the hosts in response to the operating system commands, against known operating system command results;

create historical relationships between hosts and the SAN using the received information and the known operating system command results; and use the historical relationships to train an artificial intelligence (AI) based model to:
  identify relationship changes between the hosts and the SAN,
  in response to identifying a relationship change between the hosts and the SAN, compare the identified relationship change against known fingerprints,
  in response to determining the identified relationship change does not match one of the known fingerprints, issue between 1 and N additional operating system commands to the respective hosts,
  compare additional information received from the hosts in response to the additional operating system commands, against the known fingerprints, and
  in response to the additional information matching one of the known fingerprints, issue between 1 and M operating system specific commands.

18. The CS of claim 17, wherein the operating system specific commands are issued to the host corresponding to the one of the known fingerprints that matches the additional information, wherein the AI based model is further trained to:
  use information received from the corresponding host in response to the operating system specific commands to update the known fingerprints that matches the additional information.

19. The CS of claim 17, wherein the AI based model is further trained to:
  in response to the additional information not matching one of the known fingerprints, cause at least one new known fingerprint to be generated; and
  initiate a dynamic retraining of the AI based model to incorporate the at least one new known fingerprint.

20. The CS of claim 17, wherein the AI based model is further trained to:
  in response to determining the identified relationship change matches one of the known fingerprints, updating the one of the known fingerprints to incorporate the identified relationship change.

* * * * *